(12) United States Patent
Feller et al.

(10) Patent No.: US 10,904,228 B2
(45) Date of Patent: Jan. 26, 2021

(54) ENCODER, DECODER, SYSTEM AND METHOD FOR TRANSMITTING ENCRYPTED DATA

(71) Applicant: Fraunhofer-Gesellschaft zur Foerderung der angewandten Forschung e.V., Munich (DE)

(72) Inventors: Olaf Feller, Ribeauvillé (DE); Ute Troppenz, Berlin (DE); Norbert Grote, Berlin (DE); Torsten Mehlhorn, Berlin (DE)

(73) Assignees: Fraunhofer-Gesellschaft zur Foerderung der angewandten Forschung e.V., Munich (DE); timeproof gmbh, Hamburg (DE)

( * ) Notice: Subject to any disclaimer, the term of this patent is extended or adjusted under 35 U.S.C. 154(b) by 473 days.

(21) Appl. No.: 15/288,713

(22) Filed: Oct. 7, 2016

(65) Prior Publication Data

US 2017/0026351 A1   Jan. 26, 2017

Related U.S. Application Data

(63) Continuation of application No. PCT/EP2015/057592, filed on Apr. 8, 2015.

(30) Foreign Application Priority Data

Apr. 11, 2014 (DE) .................. 10 2014 207 026

(51) Int. Cl.
*H04K 1/00* (2006.01)
*H04L 29/06* (2006.01)
(Continued)

(52) U.S. Cl.
CPC ..... *H04L 63/0485* (2013.01); *H04B 10/2581* (2013.01); *H04L 9/0852* (2013.01);
(Continued)

(58) Field of Classification Search
USPC ........................................................ 380/256
See application file for complete search history.

(56) References Cited

U.S. PATENT DOCUMENTS

2003/0226089 A1* 12/2003 Rasmussen ............. H04L 1/004
714/758
2010/0088511 A1 4/2010 Tavernier et al.
(Continued)

FOREIGN PATENT DOCUMENTS

| DE | 102006048793 A1 | 4/2008 |
|---|---|---|
| FR | 2912020 A1 | 8/2008 |
| WO | 2013157245 A1 | 10/2013 |

OTHER PUBLICATIONS

"Active Optical Cables", www.finisar.com, 2016, 4 pages.
(Continued)

*Primary Examiner* — Wasika Nipa
*Assistant Examiner* — Samuel Ambaye
(74) *Attorney, Agent, or Firm* — Perkins Coie LLP; Michael A. Glenn (57) ABSTRACT

An encoder for providing encrypted data for transmission via a transmission medium includes an encryption unit that is configured to encrypt data received at the encoder block by block and a processing unit. The processing unit is configured to randomly distribute an encrypted data block to a plurality of channels that are allocated to the transmission medium and to provide a sub-block, which includes part of the encrypted data block, to be transmitted via one of the channels, together with a channel identification allocated to the channel and a code value that is based on the encrypted data in the sub-block to be transmitted and the channel identification, for transmission via the allocated channel of the transmission medium.

17 Claims, 9 Drawing Sheets

(51) Int. Cl.
*H04B 10/2581* (2013.01)
*H04L 9/32* (2006.01)
*H04L 9/08* (2006.01)
*G02B 6/02* (2006.01)
*G02B 6/28* (2006.01)

(52) U.S. Cl.
CPC ........ *H04L 9/3236* (2013.01); *G02B 6/02042* (2013.01); *G02B 6/2821* (2013.01)

(56) References Cited

U.S. PATENT DOCUMENTS

| | | | | |
|---|---|---|---|---|
| 2011/0138257 A1* | 6/2011 | Zivic | ..................... | H03M 13/09 714/777 |
| 2012/0177065 A1* | 7/2012 | Winzer | .............. | H04B 10/2581 370/480 |
| 2012/0328100 A1 | 12/2012 | Hirota et al. | | |
| 2013/0094650 A1* | 4/2013 | Mendel | .................. | H04L 9/002 380/255 |
| 2014/0153883 A1* | 6/2014 | Mukasa | ............. | G02B 6/02042 385/100 |
| 2015/0078744 A1* | 3/2015 | Ito | .......................... | H04J 14/04 398/43 |

OTHER PUBLICATIONS

"Tentative SHA-3 Standard (FIPS) Development Timeline", NIST, Retrieved May 27, 2013; NIST SHA, Oct. 2, 2012, 3 pages.

Atsushi, Okamoto et al., "Mode Division Multiplex Communication Technique Based on Dynamic Volume Hologram and Phase Conjugation", Micro-Optics, Proceedings of SPIE, vol. 7716, Bellingham, WA, 2010, 10 pages.

Bertoni, Guido et al., "Keccak and the SHA-3 Standardization", NIST, Gaithersburg, MD, Feb. 6, 2013, 71 pages.

Guan, Kyle et al., "Information-Theoretic Security in Space-Division Multiplexed Fiber Optic Networks", 2012 38th European Conference and Exhibition on Optical Communications, OSA, 2012, pp. 1-3.

ITU-T, G.987.3, "10-Gigabit -Capable Passive Optical Networks (XG-PON): Transmission Convergence (TC) Specifications; G.987.3 (10/10)", ITU-T Standard, Series G: Transmission System and Media, Digtal Systems and Networks, International Telecommunication Union, Geneva, CH, Oct. 2010, pp. 1-134.

Li, Ming-Jun et al., "Multicore Fiber for Optical Interconnect Applications", 17th Optoelectronics and communications Conference OECC 2012, IEEE Technical Digest, Buson, Korea, Jul. 2012, pp. 564-565.

MOLEX, "Industry-Leading PSM4 Optical Cables (AOCs) Achieve 40 to 56 Gbps Data Rates Over Long Reaches up to 4km", www.luxtera.com, 2013, 3 pages.

NIST, "SHA-3 Standardization", National Institute of Standards and Technology, Feb. 11, 2013, 1 page.

Ryf, R. et al., "Space-Division Multiplexed Transmission Over 4200-km 3-Core Microstructured Fiber", PDP5C.2, Optical Fiber Communication Conference and Expositions, 2012.

Wikipedia, "SHA-3", https://en.wikipedia.org/wiki/SHA-3, retrieved Jul. 12, 2016, Jul. 2016, 5 pages.

Winzer, P.J. et al., "Optical MIMO-SDM System Capacities", OFC 2014, OSA, 2014, pp. 1-3.

* cited by examiner

ENCODER, DECODER, SYSTEM AND METHOD FOR TRANSMITTING ENCRYPTED DATA

CROSS-REFERENCE TO RELATED APPLICATIONS

This application is a continuation of copending International Application No. PCT/EP2015/057592, filed Apr. 8, 2015, which is incorporated herein by reference in its entirety, and additionally claims priority from German Application No. 10 2014 207 026.0, filed Apr. 4, 2014, which is also incorporated herein by reference in its entirety.

The present invention relates to the field of data transmission, in particular to the field of interception-proof data transmission.

BACKGROUND OF THE INVENTION

In conventional technology, protected data networks and transmission paths are mainly realized by encrypting the data. The degree of obtainable security can be adjusted via the complexity of the used encryption, wherein currently in particular symmetrical crypto-algorithms are used in security relevant networks, such as AES, 3DES, as explained, for example, in reference [1]. For transmitting high amounts of data in data centers, as well as in so-called intra-office connections, active optical cables are increasingly used, wherein these can be multi-mode fibers or single mode fibers operating in connection with high bit rate transmitters and receivers, as discussed exemplarily in references [2] and [3]. In such communication networks based on optical fibers, but also in all other communication networks where sensitive data are exchanged, a high degree of data protection is necessitated. Conventional approaches known in conventional technology ensure security against protection normally based on different encryption technologies. In addition, it is also desirable to provide monitored transmission paths in order to prevent intercepting of, copying of or interfering with data or at least to impede and detect it. In conventional technology, so far no security concepts are used which incorporate the physical structure of the transmission path, for example, the structure of optical fiber cables, such that the physical characteristics of the actual transmission path are not directly used for the security or protection method. Further, in conventional technology, no differentiation between information channel and data channel or a mixture of both is made for the transmission path.

SUMMARY

According to an embodiment, an encoder for providing encrypted data for transmission via a transmission medium may have: an encryption unit configured to encrypt data received at the encoder block by block; and a processing unit configured to distribute an encrypted data block randomly to a plurality of channels allocated to the transmission medium such that respective sub-blocks result, each including a portion of the encrypted data in the encrypted data block and provide each of the sub-blocks to be transmitted via one of the channels together with channel identification allocated to the channel and a code value that is based on the encrypted data in the sub-block to be transmitted and the channel identification, for transmission via the allocated channel of the transmission medium.

According to another embodiment, a decoder for decrypting data provided by the inventive encoder and transmitted via the transmission medium may have: a processing unit that is configured to verify, based on the received code value, the portion of the encrypted data block in the sub-block and the channel identification allocated to the channel, manipulation-free transmission of the data, and combine the received sub-blocks to an encrypted data block; and a decryption unit that is configured to decrypt the encrypted data block.

According to another embodiment, a system for transmitting data may have: an inventive encoder for providing encrypted data for transmission; and a transmission medium for transmitting the data provided by the encoder.

According to another embodiment, a method for providing encrypted data for transmission via a transmission medium may have the steps of: block by block encrypting of data; randomly distributing an encrypted data block to a plurality of channels allocated to the transmission medium such that respective sub-blocks result, each including a portion of the encrypted data in the encrypted data block, and providing each of the sub-blocks to be transmitted via one of the channels together with a channel identification allocated to the channel and a code value that is based on the encrypted data in the sub-block to be transmitted and the channel identification, for transmission via the allocated channel of the transmission medium.

According to another embodiment, a method for decrypting data provided by the method for providing encrypted data for transmission via a transmission medium, the method for providing having the steps of: block by block encrypting of data; randomly distributing an encrypted data block to a plurality of channels allocated to the transmission medium such that respective sub-blocks result, each including a portion of the encrypted data in the encrypted data block, and providing each of the sub-blocks to be transmitted via one of the channels together with a channel identification allocated to the channel and a code value that is based on the encrypted data in the sub-block to be transmitted and the channel identification, for transmission via the allocated channel of the transmission medium; and transmitted via the transmission medium, may have the steps of: verifying manipulation-free transmission of the data based on the received code value, the portion of the encrypted data block in the sub-block and the channel identification allocated to the channel; combining the received sub-blocks to the encrypted data block; and decrypting the encrypted data block.

According to another embodiment, a method for transmitting data via a transmission medium may have the steps of: providing encrypted data for transmission via a transmission medium, having block by block encrypting of data; randomly distributing an encrypted data block to a plurality of channels allocated to the transmission medium such that respective sub-blocks result, each including a portion of the encrypted data in the encrypted data block, and providing each of the sub-blocks to be transmitted via one of the channels together with a channel identification allocated to the channel and a code value that is based on the encrypted data in the sub-block to be transmitted and the channel identification, for transmission via the allocated channel of the transmission medium, transmitting the data via the transmission medium; and decrypting the transmitted data provided by the method for providing encrypted data for transmission via a transmission medium, the method for providing having the steps of: block by block encrypting of data; randomly distributing an encrypted data block to a plurality of channels allocated to the transmission medium such that respective sub-blocks result, each including a portion of the encrypted data in the encrypted data block, and providing each of the sub-blocks to be transmitted via one of the channels together with a channel identification allocated to the channel and a code value that is based on the encrypted data in the sub-block to be transmitted and the channel identification, for transmission via the allocated channel of the transmission medium; and transmitted via the transmission medium, having the steps of: verifying manipulation-free transmission of the data based on the received code value, the portion of the encrypted data block in the sub-block and the channel identification allocated to the channel; combining the received sub-blocks to the encrypted data block; and decrypting the encrypted data block.

Another embodiment may have a non-transitory digital storage medium having a computer program stored thereon to perform the method for providing encrypted data for transmission via a transmission medium, when said computer program is run by a computer.

Another embodiment may have a non-transitory digital storage medium having a computer program stored thereon to perform the method for decrypting data provided by the method for providing encrypted data for transmission via a transmission medium and transmitted via the transmission medium, when said computer program is run by a computer.

Another embodiment may have a non-transitory digital storage medium having a computer program stored thereon to perform the method for transmitting data via a transmission medium, when said computer program is run by a computer.

According to another embodiment, a transmission medium for secure data transmission may have: an optical multicore fiber, wherein at least one core of the multicore fiber defines a data channel for transmission of the data, and wherein at least one core of the multicore fiber defines a monitor channel, wherein the monitor channel is provided to, if a change has been made at the optical multicore fiber, detect additional optical power in an optical monitoring signal carried in the monitor channel or an evanescent optical field of a data signal in the data channel received in the monitor channel.

According to another embodiment, a system for transmitting data may have: a signal source for providing data for transmission; and an inventive transmission medium, wherein the signal source is configured to effect the occupancy of the cores of the multicore fiber for usage as data channel and as monitor channel in a flexible or random manner, and to detect, in the monitor channel, an evanescent optical field of a data signal in the data channel.

According to another embodiment, a method for transmitting data may have the steps of: providing data for transmission via a multicore fiber; selecting an occupancy of the cores of the multicore fiber for usage as data channel and as monitor channel; transmitting the data via the data channel of the multicore fiber; and if a change has been made at the optical multicore fiber, detecting additional optical power in an optical monitoring signal carried in the monitor channel or an evanescent optical field of the data signal in the data channel received in the monitor channel.

The present invention provides an encoder for providing encrypted data for transmission via a transmission medium, comprising:
an encryption unit that is configured to encrypt data received at the encoder block by block; and
a processing unit configured to distribute an encrypted data block randomly to a plurality of channels allocated to the transmission medium, and provide a sub-block including a portion of the encrypted data block to be transmitted via one of the channels together with a channel identification allocated to the channel and a code value that is based on the encrypted data in the sub-block to be transmitted and the channel identification, for transmission via the allocated channel of the transmission medium.

Further, the present invention provides a method for providing encrypted data for transmission via a transmission medium, comprising the steps of:
block by block encrypting of data;
randomly distributing an encrypted data block to a plurality of channels allocated to the transmission medium, and
providing a sub-block including a portion of the encrypted data block to be transmitted via one of the channels together with channel identification allocated to the channel and a code value that is based on the encrypted data in the sub-block to be transmitted and the channel identification, for transmission via the allocated channel of the transmission medium.

According to the present invention, an approach is taught that substantially increases the security of transmission of data in communication networks, wherein this approach is not only based on the crypto-algorithms known in conventional technology and currently used, such as AES, 3DES, but additionally suggests parallel encoding, such as encoding by using a hash function, ensuring increased security against interception by using the physical characteristics of the transmission channel together with a division of the data blocks to be transmitted in sub-data blocks. Basically, the inventive approach also allows secure transmission by using wireless communication in that, based on the inventive approach, manipulations of the transmitted data can be detected at the receiver.

According to embodiments of the invention, an approach is provided for providing a monitored transmission path where interception attempts, copy attempts or interference of data are prevented or at least impeded, wherein a wire or fiber based transmission path can be used for transmitting the data whose physical characteristics are utilized. Such embodiments use a wire or fiber based transmission path offering further options for making the transmission even more secure against interception. According to embodiments of the present invention, an approach is provided allowing interception-proof high-speed data transmission based on parallel optical links. In conventional technology, optical fiber networks that are indispensable, for example, for high data rates and long transmission paths, were meant to be secure compared to purely electronic systems. However, optical fiber paths are also not absolutely protected, since with non-destructive methods, such as by bending a fiber, coupling-out the optical signal and hence the transmitted data can be effected. Further, by mechanical manipulation, it is possible to try to use the evanescent optical field for interception purposes, which results in a minimum optical loss in the data signal that is, however, very difficult to detect. Further, such losses can also have other reasons. A possible "attack" on the data connection is thus only indirect and also only difficult to trace, for example, based on a localization of the interference, which necessitates, however, an expensive method which can normally not be performed synchronously with the data transmission, for example, optical time domain reflectometry (OTDR). In contrast, embodiments of the invention also use the physical characteristics of the transmission path for the security method.

Thus, embodiments of the invention provide interception-proof active optical link consisting of a processor part, for example, in the encoder, performing data encryption, hash-value calculation and time-based random distribution of the encrypted data block portions to the optical channels. Further, respective fast optical transmitters and receivers, including respective drivers, as well as optical multicore single mode fiber links are provided.

According to embodiments, the security is obtained in several dimensions simultaneously, in that a parallel security mechanism is applied to the whole data link including the transmission path, in that the data are protected with the help of a parallel hash algorithm and the results of the parallel protection are distributed on parallel optical links, wherein the cardinality of the optical transmission signal is identical to the number of parallel data channels whose security is synchronously monitored.

Further, the present invention provides a transmission medium for secure data transmission, comprising:
an optical multicore fiber,
wherein at least one core of the multicore fiber defines a data channel for transmission of the data, and
wherein at least one core of the multicore fiber defines a monitor channel.

According to embodiments, the monitor channel is provided to carry a monitoring signal or to receive an evanescent optical field of a data signal in the data channel.

According to embodiments, the evanescent optical field of the data signal effects, in the data channel when the multicore fiber is bent or damaged, coupling-in of additional optical power from the data channel into the monitor channel.

According to embodiments, the monitor channel carries constant light (including "no light") or a modulated optical signal, such that evanescent coupling-out of a data signal optically superposes the signal in the monitor channel and effects a detectable interference.

According to embodiments, the optical multicore fiber includes a plurality of data channels for parallel transmission of one or several data signals.

According to embodiments, the occupancy of the cores of the multicore fiber is flexible for the usage as data channel and as monitor channel and can be adapted to the respective type of fiber or type of application.

According to embodiments, the plurality of cores of the optical multicore fiber are arranged within a common cladding, wherein a first number of cores are arranged adjacent to a surface of the multicore fiber and a second number of cores are arranged in the center of the multicore fiber and wherein the central cores define the data channels and the peripheral cores define the monitor channels.

According to embodiments, the plurality of cores of the optical multicore fiber are arranged within a common cladding, wherein a first number of cores are arranged adjacent to a surface of the multicore fiber and a second number of cores are arranged in the center of the multicore fiber and wherein at least a central core and the peripheral cores define the data channels and the cores arranged, with respect to the radius, between the peripheral cores and the at least one central core, define the monitor channel.

According to embodiments, the plurality of cores of the optical multicore fiber are arranged within a common cladding, wherein the occupancy of the cores of the multicore fiber is such that data channels and monitor channels alternate.

Further, the present invention provides a system for transmitting data, comprising:

a signal source for providing data for transmission; and
a transmission medium according to embodiments of the invention;
wherein the signal source is configured to effect the occupancy of the cores of the multicore fiber for usage as data channel and as monitor channel in a flexible or random manner, and to provide and monitor a monitoring signal for the monitor channel or to detect, in the monitor channel, an evanescent optical field of a data signal in the data channel.

Further, the present invention provides a method for transmitting data, comprising:
providing data for transmission via a multicore fiber;
selecting an occupancy of the cores of the multicore fiber for usage as data channel and as monitor channel;
transmitting the data via the data channel of the multicore fiber; and
providing and monitoring a monitoring signal in the monitor channel or detecting, in the monitor channel, an evanescent optical field of a data signal in the data channel.

Thus, according to embodiments, physical monitoring of the actual transmission path is performed in that, in addition to the information channels, monitor channels are guided in parallel within the multicore fiber, which allows evaluation of monitoring signals or evanescently coupled optical power in the monitor channels. In the monitor channels, also, extraneous light can be transported, which masks the data signals when coupling-out the data signals for interception purposes. Further, within the fiber, by a specific arrangement of data and monitor cores, the information-carrying cores can be protected from access from the outside ("hidden") wherein, within the security concept, the spatial allocation of monitor and data cores can be used as additional encryption function.

When using the multicore fibers, each of the parallel transmission channels has an exactly equal physical and, when assuming the same wave-guide conditions, optical transmission length, whereby prevention/reduction of signal propagation time effects (skew) can be obtained. Alternatively, the protection method can also be used based on simple monomode fibers wherein then an additional encryption layer is provided.

BRIEF DESCRIPTION OF THE DRAWINGS

Embodiments of the present invention will be detailed subsequently referring to the appended drawings, in which:

FIG. 3a-c are different examples for realizing an interception-proof optical link by using multicore fibers, wherein FIG. 3(a) shows a fiber with a plurality of cores arranged within a common cladding, wherein FIG. 3(b) shows different examples for the occupancy of cores in the multicore fibers as data and monitor channels, and wherein

FIG. 6a-b is a schematic illustration of the inventive approach according to embodiments of the invention, wherein FIG. 6(a) shows processing of a data block in an encoder as illustrated in FIG. 1 or FIG. 4, and wherein

DETAILED DESCRIPTION OF THE INVENTION

In the following description of the embodiments of the present invention, the same or equal elements are provided with the same reference numbers.

The following description of embodiments is based on a transmission system using optical links, for example, MC fibers (MC=multicore) or single core fibers. However, it should be noted here that the basic inventive approach can also be used in different transmission connections, for example, in a wired connection but also wireless communication, since due to the inventive approach the transmission of sensitive data is performed in data blocks that are divided onto a plurality of sub-channels whose manipulation alone does not enable decryption of the data, rather, at the same time, massive manipulation of all sub-channels is necessitated in order to obtain the information necessitated for an entire data block, which significantly increases the security against interception of each transmission path, independent of its design.

Figure 1:
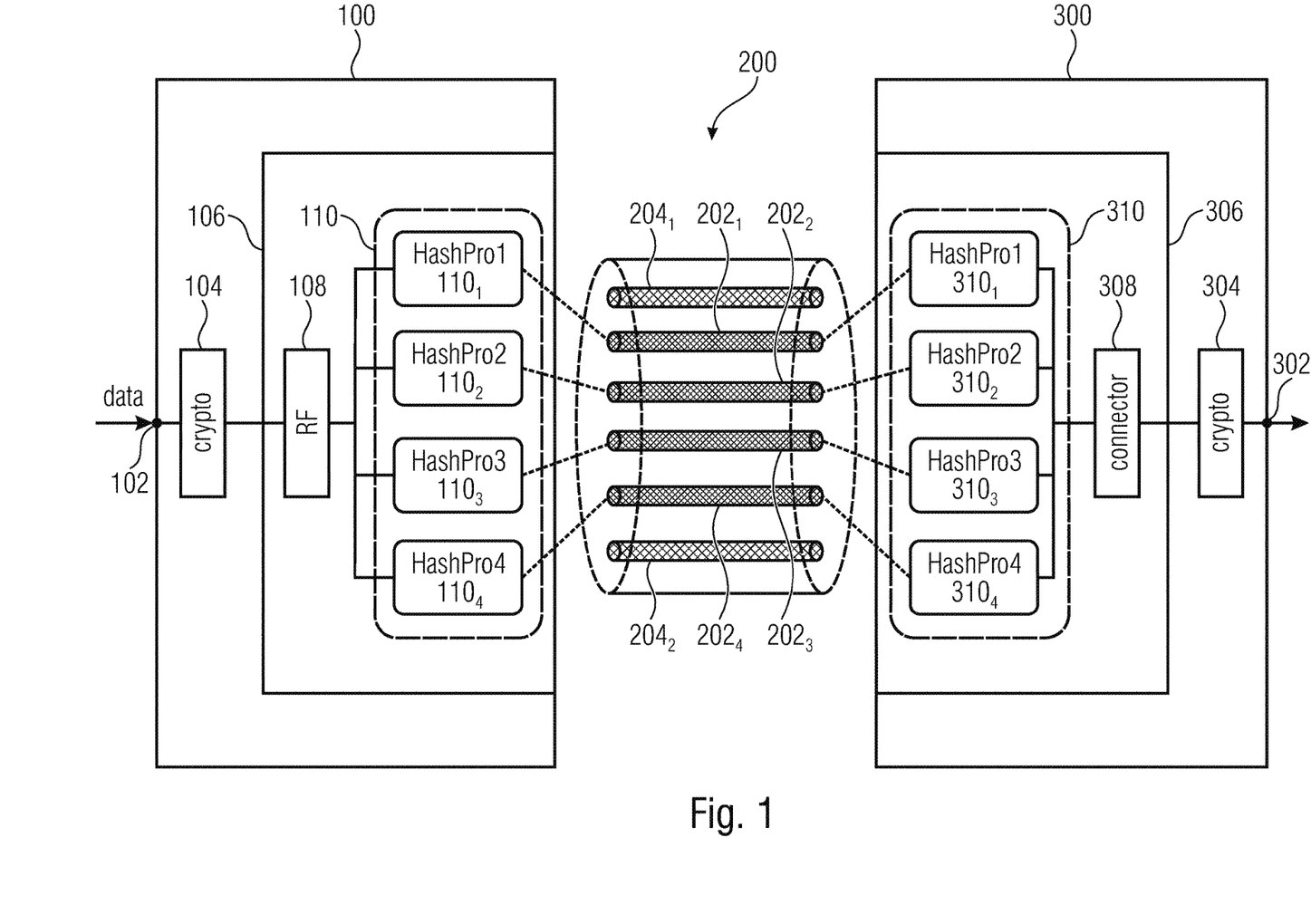
FIG. 1 is a secure data transmission system according to an embodiment of the present invention.

Based on FIG. 1, a structure of a secure data connection according to an embodiment of the present invention will be discussed below in more detail, wherein FIG. 1 illustrates an embodiment where four parallel processors are provided for high-speed encryption/decryption by means of symmetrical decryption, wherein further, according to the invention, parallel hash algorithms are used, as well as interception-proof optical fiber links including data channels and monitor channels. The transmission system includes an encoder 100 receiving data intended for transmission at an input 102. The data received at the input 102 are supplied to an encryption or crypto-processor 104 which encrypts the received data in a known manner, for example, by using a symmetrical crypto-algorithm. The crypto-processor 104 is configured such that based on the applied crypto-algorithm, the received data are encrypted block by block, such that respectively encrypted data blocks are provided at the output of the crypto-processor 104. The encrypted data block is provided to a processing unit 106, which is provided to divide each of the data blocks for transmission via the transmission medium. The processing unit 106 includes a random processor 106 which, based on a time-controlled random function (RF), randomly divides or allocates each received data block encrypted by the crypto-algorithm to the available channels of the transmission medium in a random manner. In the embodiment shown in FIG. 1, it is assumed that the transmission medium includes for channels 1 . . . 4. The sub-blocks generated by the random processor 108 are provided to a hash processor 110 which includes an allocated hash unit $110a$ to $110_1$ to $110_4$ for each channel.

The system illustrated in FIG. 1 further includes the transmission medium 200, which is, in the illustrated embodiment, an optical transmission medium providing a parallel optical link. The transmission medium 200 includes a plurality of parallel optical data links, in the represented embodiment four optical data channels $202_1$ to $202_4$. The transmission medium 200 includes two monitor channels $204_1$ and $204_2$ which will be described in more detail below. The transmission medium 200 is, for example, a multicore fiber having six single mode cores $202_1$ to $202_4$ and $204_1$ to $204_2$ forming the data and monitor channels known in conventional technology. Due to the four data channels, the encoder is configured to randomly distribute an encrypted data block to exactly those four channels, such that each channel includes a 1/n portion of the encrypted data block. The transmission medium 200 is provided to couple the encoder 100 with a decoder 300, wherein the decoder receives the data transmitted via the medium 200. The decoder 300 includes an output 302 for outputting the data that have been decrypted by the decoder. Further, a crypto-processor 304 is provided which receives the transmitted and reconstructed encrypted data blocks and decrypts the same according to a conventional, for example, symmetrical, crypto-algorithm and provides them to the output 302. Further, the decoder includes a processing unit 306 that is provided to verify and connect the portions of the data block transmitted in parallel with regard to manipulation-free transmission. For that purpose, the transmission unit includes the connector 308 which is provided to connect the individual sub-data blocks with the 1/n portion of data of the data block to be transmitted to the total data block for provision to the crypto processor 304. Subsequently, the respective sub-data blocks are provided to the connector 308 for verification, wherein a hash processor 310 is provided for verification including, in the illustrated embodiment, four hash units $310_1$ to $310_4$ which verify manipulation-free transmission based on the received data as will be discussed in more detail below.

In the following, the mode of operation of the structure illustrated based on FIG. 1, in particular the mode of operation of the encoder 100 will be discussed in more detail. Then, discussion of the possible transmission media will follow, in particular in the context of configuring the same as multicore optical fibers.

As mentioned above, high transmission rates are frequently desired and are obtained by using high bit rate transmitters and receivers, wherein further parallelization of the transmission contributes to increasing the transmission rates. The inventive solution combines high data rates via optical fiber paths with highest security against interception. The protection method is based on usage of the parallel hash processors $110_1$ to $110_4$ shown in FIG. 1 which ensure the necessitated data throughput. On the encoder side, not only the encryption based on parallelization is performed, but also the information channels are guided in parallel within the entire security connection including the transmission path. Combination to a complete data signal is only performed at the decoder. Thus, the inventive parallelization algorithm is congruent to the physical transmission medium. The encryption performed in the crypto-processor 104 is performed symmetrically with the cryptographically necessitated key length, e.g. AES 512 [SYMBLOCK] at the input of the encoder. The subsequent distribution of the encrypted SYMBLOCKs is then performed by means of the time-controlled random function (RF) with sufficient entropy with the cardinality of the optical transmission fibers, e.g. in a quad fiber, the encrypted SYMBLOCK is distributed to four channels. The following will be provided for transmission via a channel:

A) the 1/n portion of the SYMBLOCKs
B) the channel number n
C) the hash value for A) and B)

The manipulation of such a sub-channel does not yet allow decryption of the data, for this, simultaneous massive manipulation of all optical channels would be necessitated. However, currently, this is merely possible for individual separate fibers but not for connected multicore fibers, such as quad cores. According to the embodiment illustrated based on FIG. 1, the security or protection stages can be structured in parallel, e.g. by the parallel hash processors HashPro1 to HashPro4, wherein the security stages or security levels of the systems can be selected or extended, (e.g. data transmission can only be performed via part of the four channels). Parallel optical data transmission links 200 can be flexibly adapted to the data encryption, wherein the time-based random distribution (RF) of the sub-data blocks including the 1/n portion of encrypted data is realized by the additional logic 108. In the decoder 300, the logic 306 verifies a manipulation-free transmission in a purely mathematical manner, which is easily possible since all data necessitated for verification exist per sub-channel, as well as the channel allocation per transmitted encrypted SYM-BLOCK. Subsequently, decryption of the verified SYM-BLOCK is performed in the crypto-processor 304 with the agreed symmetrical key as it is known in conventional technology.

Figure 2A:
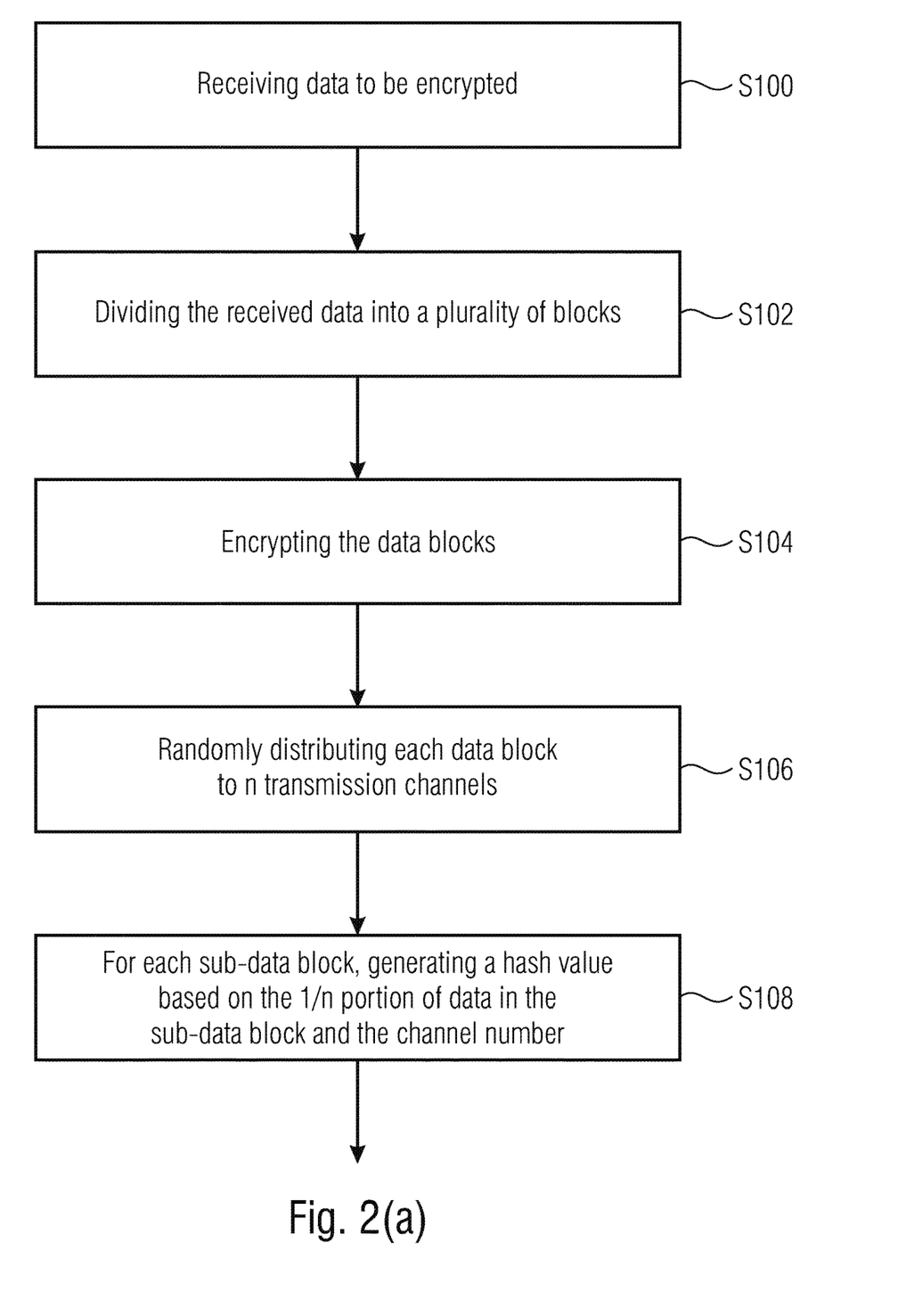
FIG. 2a-b is a flow diagram explaining the functionality of the system of FIG. 1 according to an embodiment wherein FIG. 2(a) explains the functionality of the encoder of FIG. 1 and wherein FIG. 2(b) explains the functionality of the decoder of FIG. 1.

FIG. 2(a) shows a flow diagram based on which the functionality of the encoder 100 of FIG. 1 is illustrated according to an embodiment. In a first step S100, the data to be encrypted are received and subsequently divided into a plurality of blocks in step S102, which are then encrypted in step S104. The following steps S106 and S108 are performed for each of the data blocks, wherein in step S106 random distribution of each data block to the n transmission channels is performed, wherein the number of transmission channels is defined for the transmission medium intended for transmission (see e.g. the medium 200 in FIG. 1). After the data blocks have been randomly distributed to the different channels, respective sub-data blocks result, each including a 1/n portion (n=number of transmission channels) of the encrypted data in the respective data block. For each of these sub-blocks, a hash value is generated in step S108, based on the 1/n portion of data of the encrypted data block in the sub-data block and the channel number. This information is provided for transmission.

Figure 2B:
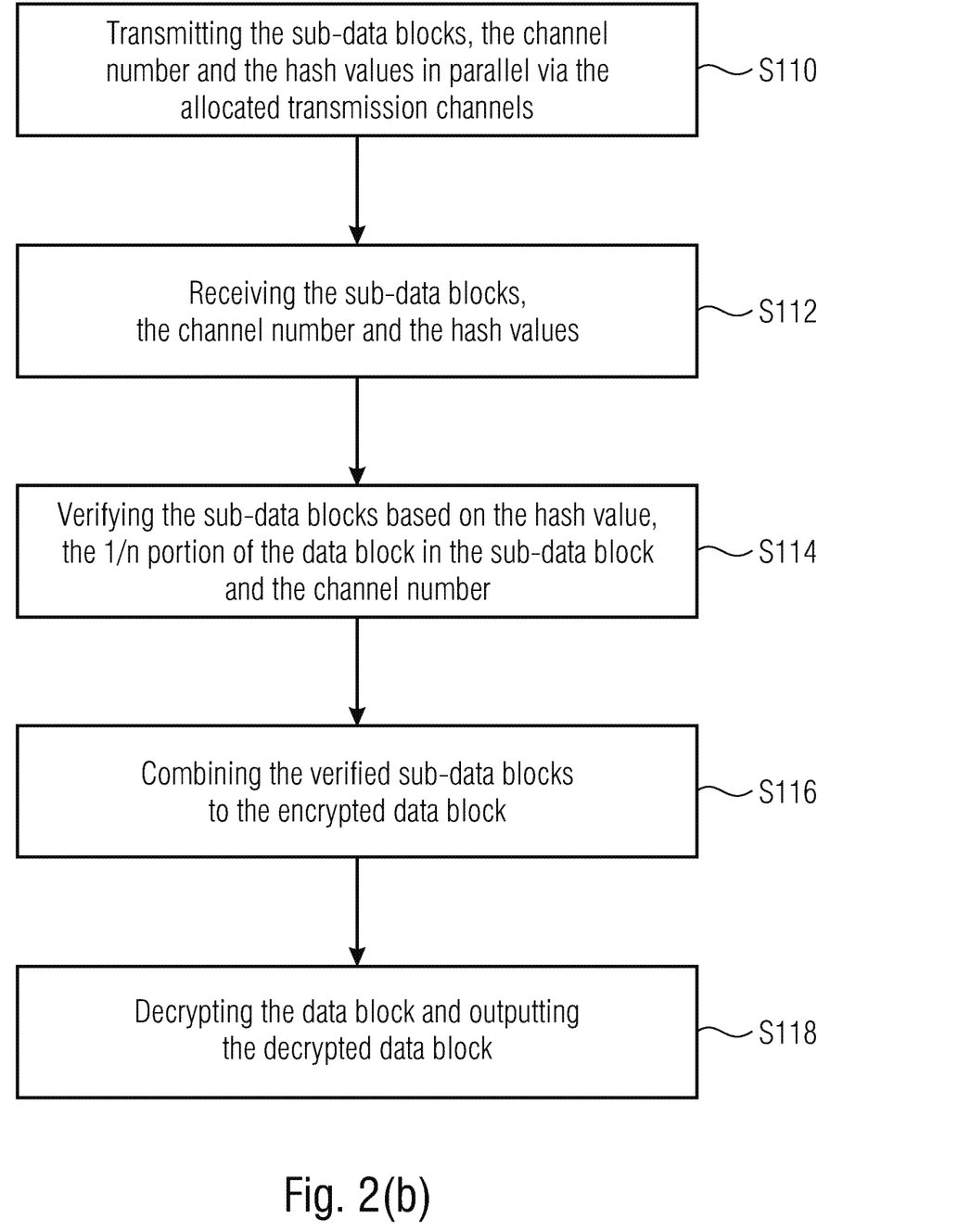

FIG. 2(b) shows the steps to be performed in the decoder 300, wherein in step S110 first, each of the sub-data blocks generated according to FIG. 2(a) is transmitted, together with the channel number allocated to this sub-data block and the allocated hash value. The plurality of sub-data blocks of an encrypted data block are transmitted in parallel via the allocated transmission channels and received in step S112, for example, at the encoder 300 shown in FIG. 1. Apart from the sub-data blocks, i.e. the 1/n portion of encrypted data of the encrypted data block, in step S112, further, the channel number and the allocated hash value are received. Based on these received values, in step S114, the received sub-data block is verified in order to determine whether transmission was manipulation-free or not. In the case of manipulation-free transmission of the sub-data blocks, in step S116, combination of the sub-data blocks to the encrypted data block is performed, which can then be decrypted in step S118 in a conventional manner, such that the included data can be provided to further processing in unencrypted form.

According to embodiments of the present invention, the transmission medium 200 includes an optical transmission medium, wherein transmission by using fast optical components necessitates the conversion of the data into optical data which are then transmitted via the optical link medium, which advantageously includes a multicore single mode fiber. The secure optical link consists of active multicore single mode fibers as described, for example, in references [4] and [5]. With single mode fiber paths and respective optical power, signals can be transmitted via paths of up to several 10 kilometers without necessitating regeneration. Thus, the optical link remains closed and unamended. When using multicore links, all fiber cores are guided within a common cladding and according to an embodiment of the present invention, such a multicore link is used for realizing the interception-proof optical link, wherein the fiber cores as already discussed briefly based on FIG. 1 are used for transmitting information signals (see channels $202_1$ to $202_4$ in FIG. 1) and for transmitting monitoring signals (see channels $204_1$ and $204_2$).

Figure 3A:
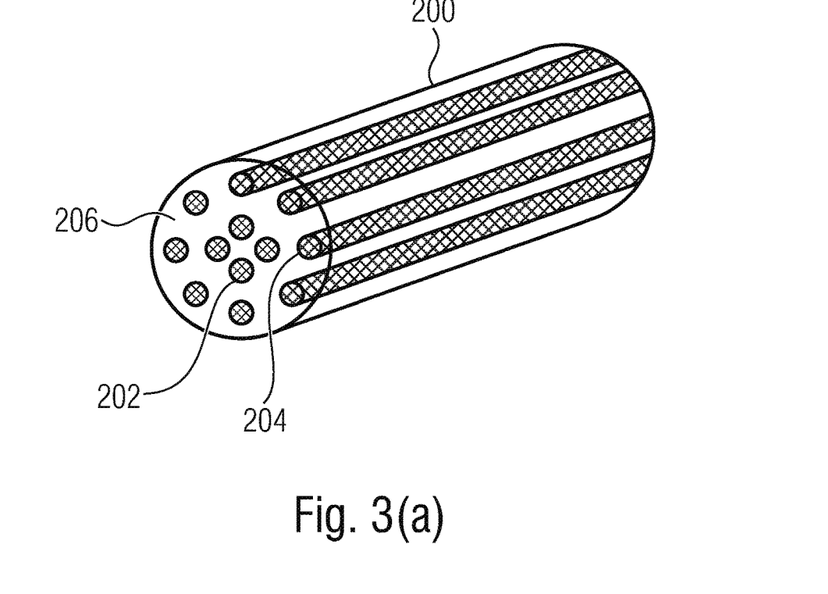
Figure 3B:
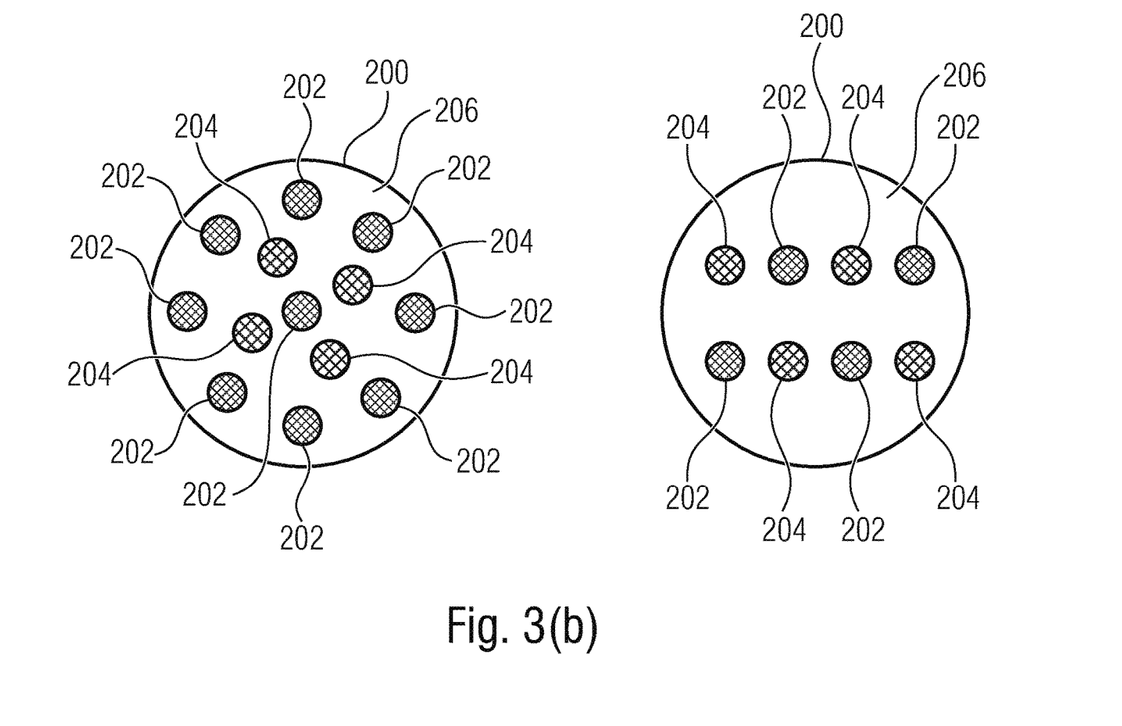

FIG. 3 shows different examples for realizing an interception-proof optical link by using multicore fibers. FIG. 3(a) shows the fiber 200 with a plurality of cores arranged within a common cladding, wherein a first number of channels 204 are arranged adjacent to the surface of the fiber 200 and a second number of channels 202 are arranged in the center of the fiber 200. According to embodiments, for the inventive parallel transmission, the central fibers 202 are used as data transmission fibers and the peripheral fibers 204 as monitored channels. The monitor fiber cores can be used, for example, for shielding the data channels which allows "hiding" of sensitive data. FIG. 3(b) shows different examples for using data and monitor cores in multicore fibers, wherein the occupancy of the channels is basically flexible and can be easily adapted to the respective type of fiber and type of application. In the illustration on the left in FIG. 3(b), a fiber 200 is illustrated, which includes a plurality of fiber cores within a common cladding 206 wherein in this example the information channels are formed by the peripherally arranged cores 202 as well as by a central core, and the monitor channels 204 are arranged, with regard to the radius, between the outer information channels and the inner information channels. The illustration on the right in FIG. 3(b) shows a different arrangement of information and data transmission channels, where the cores are arranged parallel to one another in two planes within the cladding 206 of the fiber 200, wherein monitor channels and data channels continuously alternate both in vertical and horizontal directions. In other words, there are never two channels of the same type directly adjacent in vertical and horizontal directions.

Figure 3C:
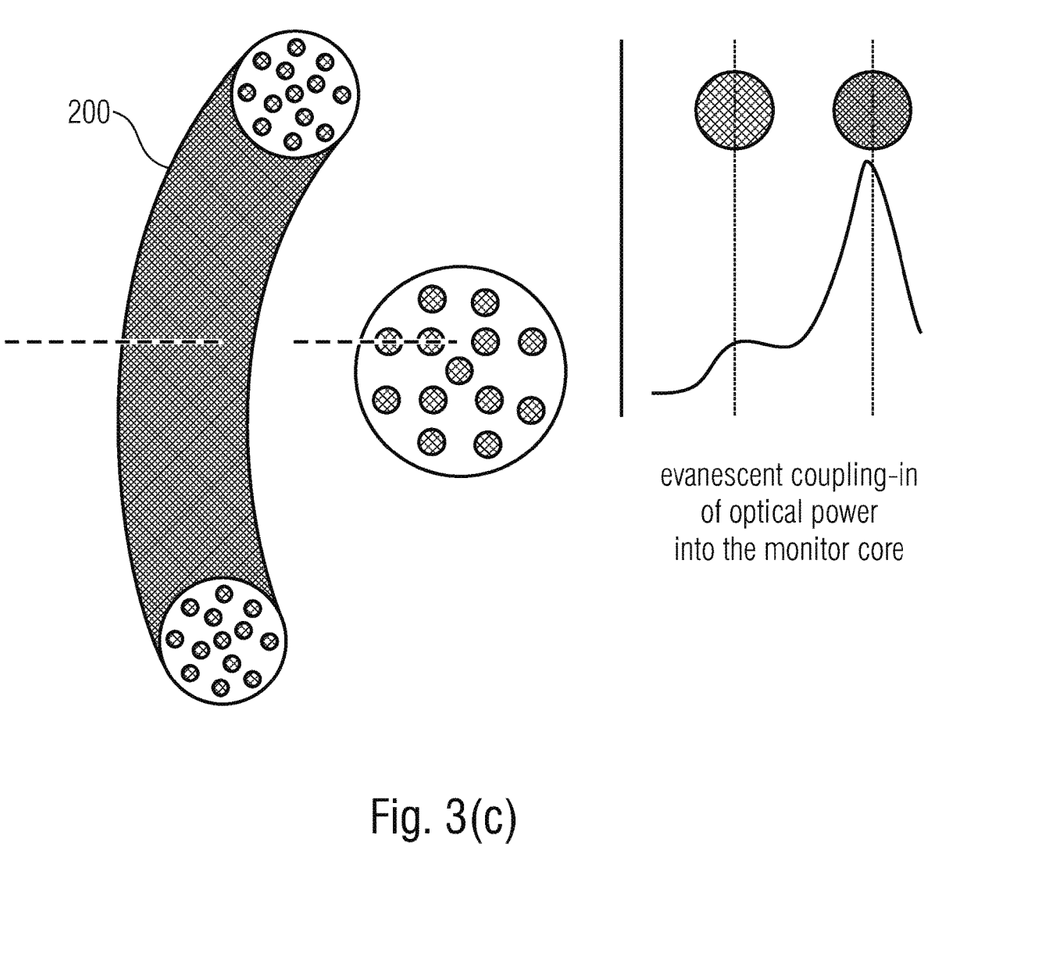
FIG. 3(c) shows an example for such monitoring by using a fiber of FIG. 3(b)

The monitor fiber cores can be used in different ways, for example, for carrying separate transmission signals or for detecting evanescent optical fields of the data carrier if changes e.g. bending or the like, takes place at the optical fiber. FIG. 3(c) shows an example for such monitoring by using a fiber which shows a distribution of the channels according to the illustration on the left in FIG. 3(b). In the figure on the left in FIG. 3(c), the bent fiber 200 is illustrated and it can be seen in the figure on the right that, due to the bending, evanescent coupling-in of additional optical power from the other channels into the monitor channels or monitor cores is performed. In other implementations, it is also possible to provide the monitor channels with constant light or modulated signals, such that during interception by means of evanescent coupling-out, data signals are optically superimposed and hence interfered. The link to the fast optical transmitters and receivers which are part of the encoders/decoders can be realized via single components or via device arrays, wherein flexible allocation of the fiber core occupancy adapted for the application has to be considered.

Figure 4:
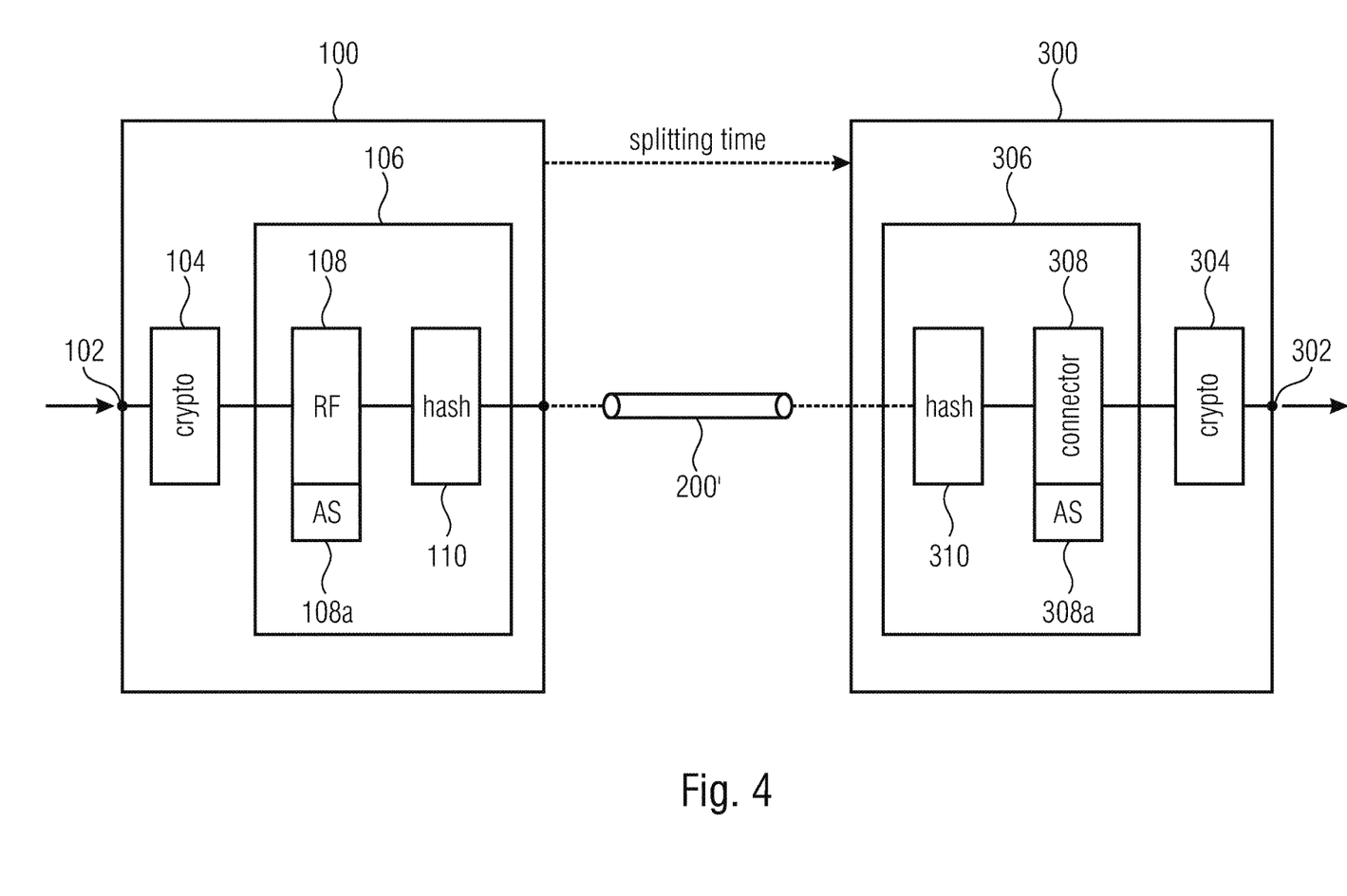
FIG. 4 is a secure data transmission system according to a further embodiment of the present invention.

The above-discussed embodiments use multicore fibers allowing parallelization of data transmission as transmission medium. According to other implementations of the present invention, however, simpler monomode fibers can be used, as illustrated schematically in FIG. 4. FIG. 4 shows a configuration of a transmission system similar to the configuration shown in FIG. 1, wherein those elements that have already been described based on FIG. 1 are provided with the same reference numbers and are not explained again. Instead of the transmission medium with a plurality of parallel channels, in the embodiment illustrated in FIG. 4, a transmission medium having only one transmission channel is used, for example, in the form of a monomode fiber. This configuration substitutes the physical security layer by a further crypto-graphical security layer, which is performed, for example, in that the time-controlled random function 108 is extended by an asymmetrical encryption 108a. During transmission via a monomode fiber, transmission is performed over a predetermined time period in respective time portions or slots that are transmitted successively in time via the fiber. In the implementation shown in FIG. 4, thus, instead of the channel number, the so-called splitting time for the SYMBLOCK is transferred from the encoder 100 to the decoder 300, wherein the decoder 300 determines, with the same time-controlled random function RF, the channel number for the allocated hash value, wherein additionally asymmetrical decryption 308a is necessitated. Increasing the cryptographic strength of the system shown in FIG. 4 can be performed by multiplying the physical channels and by providing one or several further monomode fibers.

Figure 5:
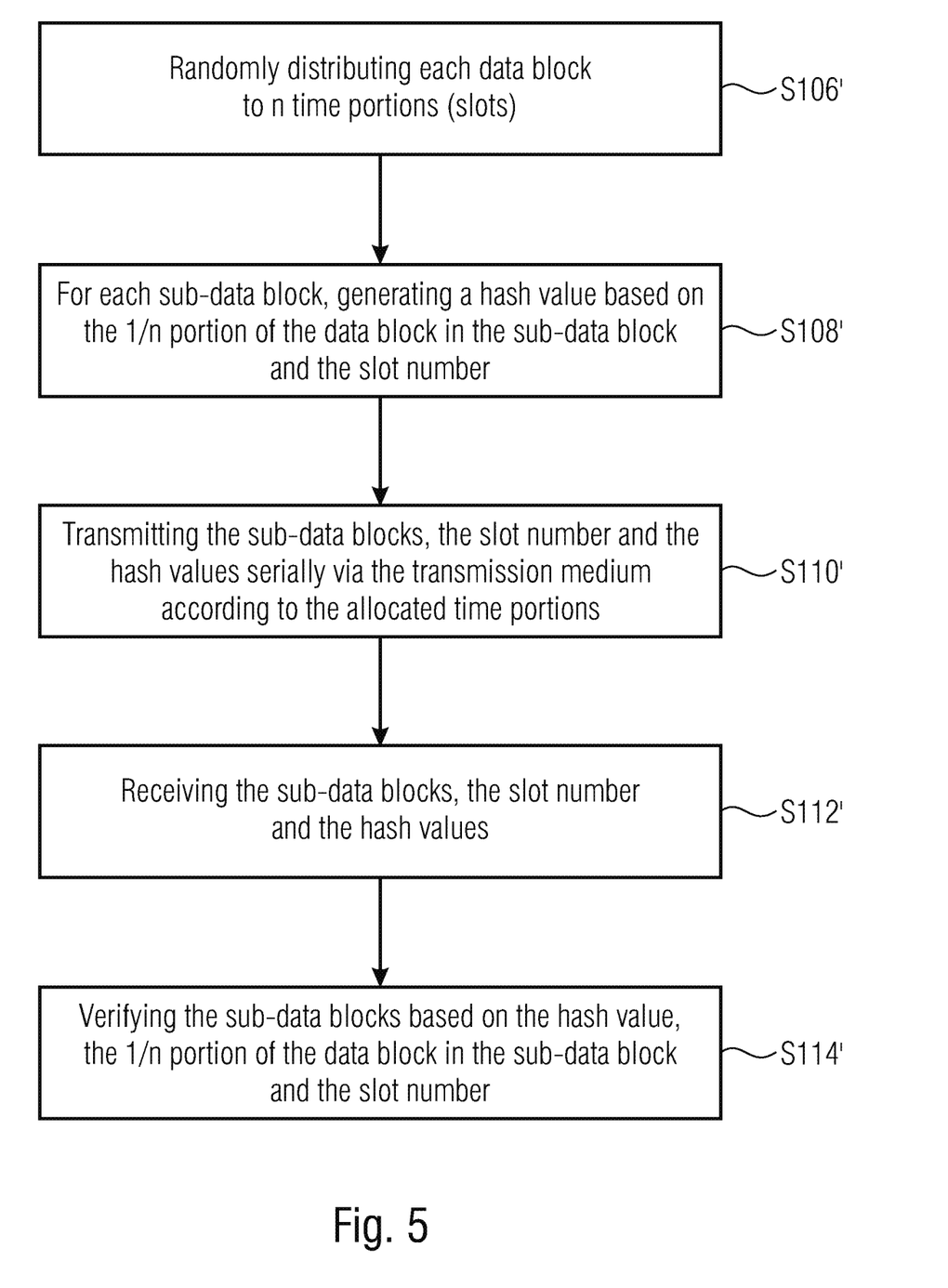
FIG. 5 is a flow diagram explaining the functionality of the system of FIG. 4 according to an embodiment.

FIG. 5 shows a flow diagram of the steps to be performed in the configuration according to FIG. 4, wherein FIG. 5 illustrates the steps amended with respect to FIG. 2. In the step S106', random distribution of each of the data blocks to n time portions (slots) is performed, and subsequently, in step S108' based on the 1/n portion of the data of the data block in the sub-data block and based on the slot number, a hash value is generated. The data gained in that way are transmitted in step S110' and received at the decoder in step S112' and there verified accordingly in step 114'.

Figure 6A:
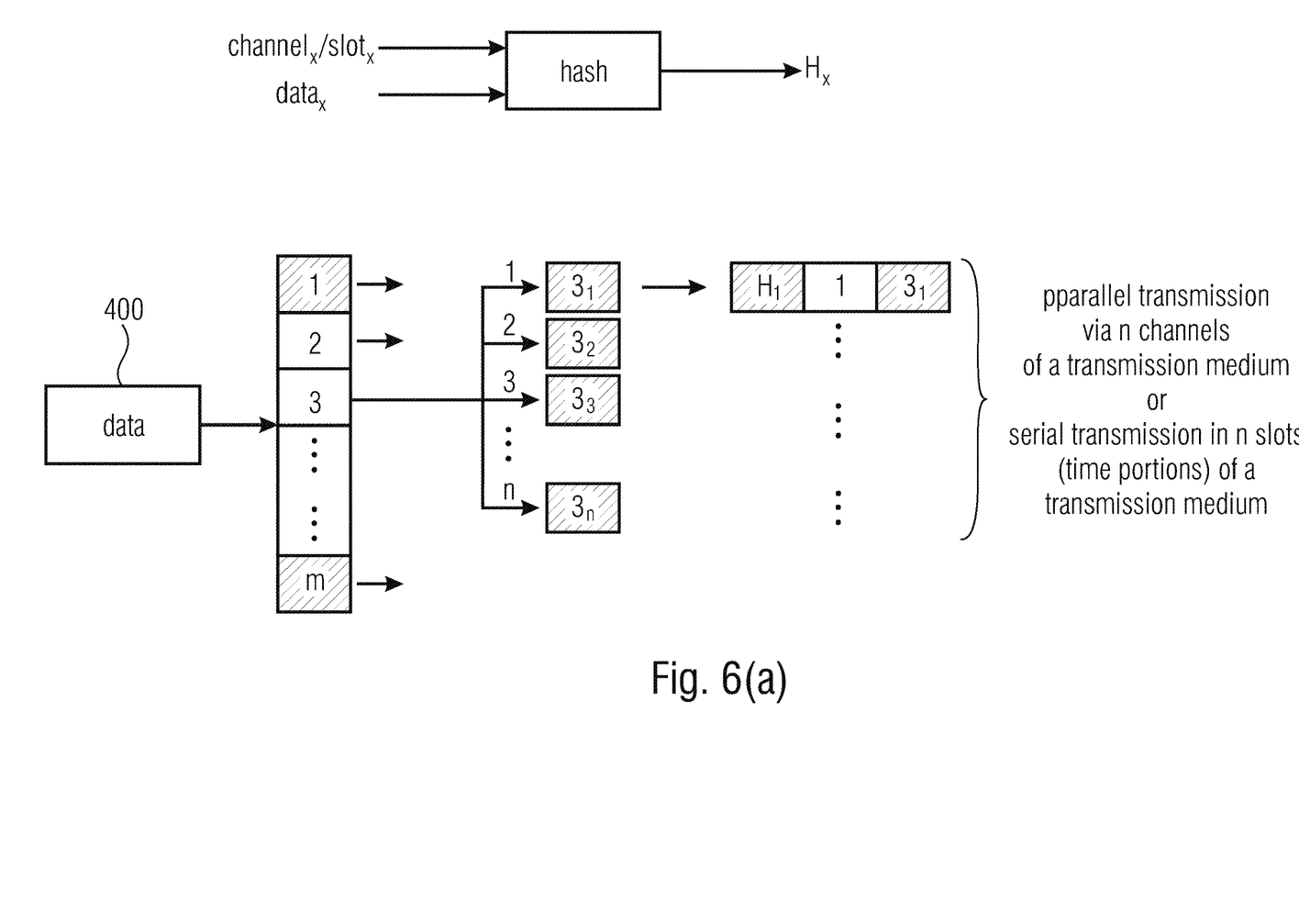

FIG. 6 explains the inventive approach as explained above based on the different data blocks. FIG. 6(a) shows processing of a data block in the encoder 300 as illustrated in FIG. 1 or 4. The data 400 are encrypted block by block in the encoder according to a conventional method, such as based on a symmetrical encryption method, such that blocks 1, 2, 3 . . . m result, which include the encrypted data for respective data blocks. In FIG. 6(a), the encrypted data block 3 is exemplarily considered, which is randomly divided to the n channels of the transmission medium, either on the parallel channels or the slots of the transmission medium successively in time, such that the sub-blocks $3_1$ to $3_n$ illustrated in FIG. 6 result. Based on the respectively allocated channel number/slot number and the data in the sub-data blocks $3_1$ to $3_n$, a hash value is generated, such that, for example, for the sub-block $3_1$ as data to be transmitted the following result: hash value $H_1$, channel number 1 and 1/n portion of data $3_1$.

Figure 6B:
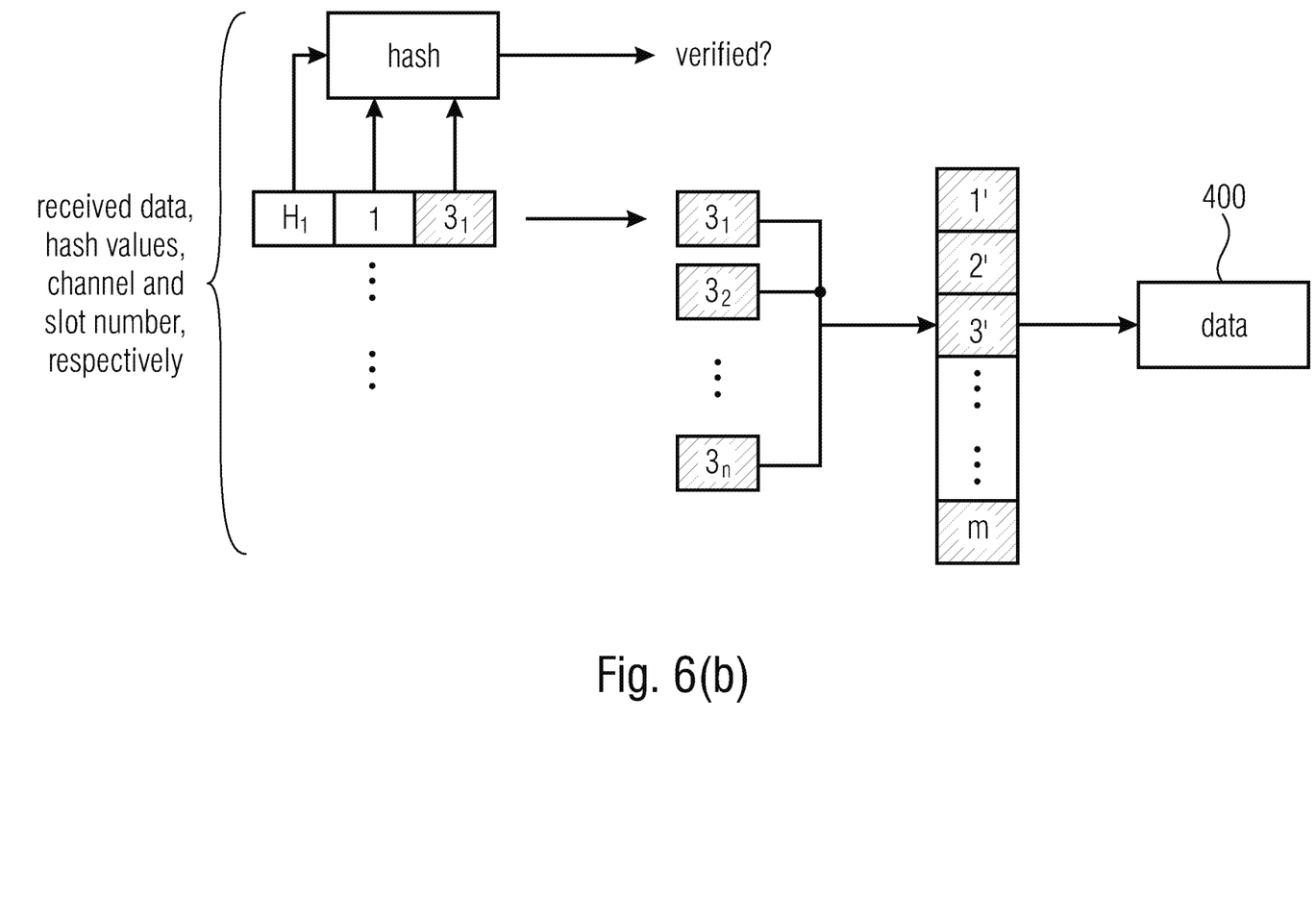
FIG. 6(b) shows processing of a data block in a decoder as illustrated in FIG. 1 or FIG. 4.

The data are transmitted either in parallel or in series as explained above based on FIGS. 1 and 4. FIG. 6(b) shows the procedure in the decoder 300 receiving the data, the hash value and channel or slot number, i.e. for sub-block $3_1$, the values $H_1$, 1 and $3_1$. Based on these values it is verified via a hash function whether manipulation of the data has taken place. If the data are verified, the 1/n portion of the data $3_1$ is provided and combined with the other received sub-blocks to the block 3 which is then supplied to a block by block decryption such that in the end the total data 400 result.

Embodiments of the invention have been described with reference to an encoder encrypting the data signals block by block and dividing each encrypted block to a plurality of data channels for parallel transmission via the optical multicore fiber. The present invention is not limited to these embodiments.

According to a further aspect of the present invention, secure transmission of data is obtained by using the above-described multicore fiber wherein, as described based on FIG. 3, at least one core defines a data channel $202_1$-$202_4$ for transmitting the data and wherein at least one core defines a monitor channel $204_1$, $204_2$. The monitor channel $204_1$, $204_2$, is provided to carry an optical transmission signal or interference signal or to receive an evanescent optical field of a data signal in the data channel $202_1$-$202_4$. The evanescent optical field of the data signal in the data channel $202_1$-$202_4$ is effected by a curvature of the multicore fiber 200, such that additional optical power from the data channel $202_1$-$202_4$ is transmitted in the monitor channel $204_1$, $204_2$. In other implementations, the monitor channel $204_1$, $204_2$ is provided with constant light or a modulated optical signal, such that evanescent coupling-out of a data signal optically superimposes the signal in the monitor channel $204_1$, $204_2$, causing a detectable interference.

In these embodiments, both encrypted data and unencrypted data can be securely transmitted. The data are securely transmitted via the inventive transmission medium, since by the used monitor channels manipulation of the fiber and/or coupling out of data can be detected securely and reliably, e.g. based on an evanescent optical field in the monitor channel due to the data signal in the data channel. Different to known approaches for monitoring, the inventive approach is advantageous since due to monitoring via the monitor channel, manipulation is detected quickly (almost in real time) and reliably without great measurement technological effort, such that counter measures can be taken at an early time, e.g. interrupting the transmission. A further advantage is that transmitting a data signal together with a signal (optical interference signal) in the monitor channel provides no useful data, even when reading out data from the fiber (e.g. by bending the fiber), since due to the bending of the fiber, the optical signals that can be read out or detected represent a non-separable superposition of the evanescent optical fields of the signal in the monitor channel and the signal in the data signal caused by the bending. In other words, when trying to manipulate the fiber, the data signal is protected by the optical signal (light) in the monitor channel.

Although some aspects have been described in the context of an apparatus, it is clear that these aspects also represent a description of the corresponding method, such that a block or device of an apparatus also corresponds to a respective method step or a feature of a method step. Analogously, aspects described in the context of a method step or as a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer. A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] "Tentative SHA-3 standard (FIPS XXX) development timeline" NIST, Retrieved 2013-05-27, NIST SHA-3 pages and the hash-forum list
[2] http://www.luxtera.com
[2] http://www.finisar.com
[4] M.-J. Li, B. Hoover, V. N. Nazarov, and D. L. Butler, "Multicore Fiber for Opti-cal Interconnect applications", 2012 17th Opto-Electronics and Communications Conference (OECC2012) Technical Digest, Paper 5E4-2
[5] R. Ryf, et. al., "Space-Division Multiplexed Transmission over 4200-km 3-Core Microstructured Fiber", PDP5C.2, Optical Fiber Communication Conference and Exposition (OFC/NFOEC), 2012

The invention claimed is:

1. An encoder for providing encrypted data for transmission via a transmission medium, comprising:
   an encryption processor, wherein the encryption processor is to encrypt data received at the encoder block by block; and
   a processor connected to the encryption processor, wherein
      wherein the processor is to receive from the encryption processor an encrypted data block provided at an output of the encryption processor,
      wherein the processor is to distribute the encrypted data block randomly to a plurality of channels allocated to the transmission medium such that respective sub-blocks result, each sub-block comprising a portion of the encrypted data in the encrypted data block and
      wherein the processor is to create for each sub-block a code value using the encrypted data in the sub-block and a channel identification, the channel identification allocated to one of the plurality of channels of the transmission medium, the sub-block to be transmitted via the one channel, and
      wherein the processor is to provide each sub-block together with the channel identification and the code value for a transmission via the one channel,
   wherein the encryption processor and the processor are implemented in hardware.

2. The encoder according to claim 1, wherein the transmission medium comprises an optical multicore fiber, wherein one core of the multicore fiber defines a channel, and wherein the processor is to provide the sub-blocks for a parallel transmission via the multicore fiber, wherein the channel identification indicates a channel number allocated to the sub-block to be transmitted.

3. The encoder according to claim 2, wherein at least one core of the multicore fiber defines a monitor channel, and wherein the processor is to provide one or several monitoring signals for transmission via the at least one monitor channel, the monitoring signal selected to detect a change of the multicore fiber.

4. The encoder according to claim 1, wherein the transmission medium comprises at least one optical monomode fiber, wherein a predetermined transmission time is allocated to a channel, and wherein the processor is to provide the sub-blocks for transmission via the monomode fiber successively in time, the channel identification indicating the splitting time allocated to the sub-block to be transmitted.

5. The encoder according to claim 4, wherein the processor is to effect an asymmetrical encryption of the sub-blocks to be transmitted.

6. The encoder according to claim 1, wherein the code value comprises a hash value for the encrypted data in the sub-block to be transmitted and the channel identification.

7. The encoder according to claim 6, wherein the unit processor comprises logic for dividing the encrypted data block and a plurality of hash processors for generating hash values based on the encrypted data in the sub-block to be transmitted and the channel identification.

8. The encoder according to claim 1, wherein the encryption processor is to effect a symmetrical encryption of the data received at the encoder.

9. A decoder for decrypting data provided by the encoder according to claim 1 and transmitted via the transmission medium, comprising:

a further processor connected to the transmission medium, wherein the further processor is to verify, based on the received code value, the portion of the encrypted data block in the sub-block and the channel identification allocated to the channel, a manipulation-free transmission of the data, and wherein the further processor is to combine the received sub-blocks to an encrypted data block; and a crypto-processor connected to the further processor, wherein the crypto-processor is to receive the encrypted data block from the further processor, wherein the crypto-processor is to decrypt the encrypted data block, wherein the further processor and the crypto-processor are implemented in hardware.

10. The decoder according to claim 9, wherein the further processor is to detect a change of the multicore fiber based on one or several received monitoring signals.

11. A system for transmitting data, comprising:
the encoder according to claim 1 for providing encrypted data for transmission; and
the transmission medium for transmitting the encrypted data provided by the encoder.

12. The system according to claim 11, wherein the transmission medium comprises an optical multicore fiber, wherein one core of the multicore fiber defines one channel, and wherein one channel number is allocated to one channel.

13. The system according to claim 12, wherein at least one core of the multicore fiber defines a monitor channel for transmitting one or several monitoring signals for detecting a change of the multicore fiber.

14. The system according to claim 11, further comprising the decoder according to claim 9 for decrypting the encrypted data transmitted by the transmission medium.

15. A method comprising:
providing encrypted data for transmission via a transmission medium by
block by block encrypting of the data;
randomly distributing an encrypted data block to a plurality of channels allocated to the transmission medium such that respective sub-blocks result, each sub-block comprising a portion of the encrypted data in the encrypted data block, and
for each sub-block
creating a code value using the encrypted data in the sub-block and a channel identification, the channel identification allocated to one of the plurality of channels of the transmission medium, the sub-block to be transmitted via the one channel, and
providing the sub-block, the channel identification and the code value for transmission via the one channel.

16. The method of claim 15, further comprising:
transmitting the encrypted data via the transmission medium, and
decrypting the encrypted data by
verifying a manipulation-free transmission of the encrypted data based on the received code value, the portion of the encrypted data block in the sub-block and the channel identification allocated to the channel;
combining the received sub-blocks to the encrypted data block; and
decrypting the encrypted data block.

17. A non-transitory digital storage medium having a computer program stored thereon to perform a method comprising:
providing encrypted data for transmission via a transmission medium by
block by block encrypting of data;
randomly distributing an encrypted data block to a plurality of channels allocated to the transmission medium such that respective sub-blocks result, each sub-block comprising a portion of the encrypted data in the encrypted data block, and
for each sub-block
creating a code value using the encrypted data in the sub-block and a channel identification, the channel identification allocated to one of the plurality of channels of the transmission medium, the sub-block to be transmitted via the one channel, and
providing the sub-block, the channel identification and the code value for transmission via the one channel,
when said computer program is run by a computer.

* * * * *